United States Patent
Bae et al.

(10) Patent No.: US 10,800,428 B2
(45) Date of Patent: Oct. 13, 2020

(54) VEHICLE DRIVING ASSISTANCE METHOD AND VEHICLE

(71) Applicant: LG ELECTRONICS INC., Seoul (KR)

(72) Inventors: Hyeonju Bae, Seoul (KR); Jeongsu Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 142 days.

(21) Appl. No.: 15/741,119

(22) PCT Filed: Dec. 16, 2015

(86) PCT No.: PCT/KR2015/013829
§ 371 (c)(1),
(2) Date: Dec. 29, 2017

(87) PCT Pub. No.: WO2017/003052
PCT Pub. Date: Jan. 5, 2017

(65) Prior Publication Data
US 2018/0194365 A1 Jul. 12, 2018

(30) Foreign Application Priority Data
Jun. 29, 2015 (KR) .......... 10-2015-0092251

(51) Int. Cl.
B60W 50/08 (2020.01)
B60W 10/18 (2012.01)
(Continued)

(52) U.S. Cl.
CPC .......... B60W 50/085 (2013.01); B60W 10/18 (2013.01); B60W 10/20 (2013.01);
(Continued)

(58) Field of Classification Search
CPC .. B60W 50/14; B60W 40/08; B60W 2420/42; B60W 2050/146;
(Continued)

(56) References Cited

U.S. PATENT DOCUMENTS 9,238,467 B1\* 1/2016 Hoye .................... B60W 50/14
2010/0036560 A1\* 2/2010 Wright .................. B60R 16/037
701/36

(Continued)

FOREIGN PATENT DOCUMENTS

JP 2015110411 6/2015
KR 1020130015739 2/2013
(Continued)

OTHER PUBLICATIONS

PCT International Application No. PCT/KR2015/013829, Written Opinion of the International Searching Authority dated Apr. 1, 2016, 3 pages.

*Primary Examiner* — Tuan C To
*Assistant Examiner* — Paul A Castro
(74) *Attorney, Agent, or Firm* — Lee, Hong, Degerman, Kang & Waimey

(57) ABSTRACT

The present invention relates to a vehicle driving assistance method comprising the steps of: selecting a driver type; detecting the driver's condition; and controlling, in phases, at least one vehicle driving assistance function or selectively controlling a plurality of vehicle driving assistance functions, according to the selected driver type and the detected driver's condition.

18 Claims, 16 Drawing Sheets

(51) Int. Cl.

| | |
|---|---|
| *B60W 40/08* | (2012.01) |
| *B60W 40/09* | (2012.01) |
| *G06K 9/00* | (2006.01) |
| *G08G 1/0962* | (2006.01) |
| *B60W 50/00* | (2006.01) |
| *G08G 1/16* | (2006.01) |
| *B60W 30/14* | (2006.01) |
| *B60W 10/20* | (2006.01) |
| *B60W 30/09* | (2012.01) |
| *B60W 30/12* | (2020.01) |
| *B60W 50/14* | (2020.01) |

(52) U.S. Cl.
CPC ............ *B60W 30/09* (2013.01); *B60W 30/12* (2013.01); *B60W 30/14* (2013.01); *B60W 30/143* (2013.01); *B60W 40/08* (2013.01); *B60W 40/09* (2013.01); *B60W 50/0098* (2013.01); *B60W 50/14* (2013.01); *G06K 9/00838* (2013.01); *G06K 9/00845* (2013.01); *G08G 1/0962* (2013.01); *G08G 1/16* (2013.01); *G08G 1/165* (2013.01); *G08G 1/166* (2013.01); *B60W 2040/0881* (2013.01); *B60W 2050/0064* (2013.01); *B60W 2050/0082* (2013.01); *B60W 2050/0083* (2013.01); *B60W 2420/42* (2013.01); *B60W 2540/043* (2020.02); *B60W 2540/10* (2013.01); *B60W 2540/12* (2013.01); *B60W 2540/18* (2013.01); *B60W 2540/30* (2013.01); *B60W 2552/05* (2020.02); *B60W 2554/00* (2020.02); *B60W 2555/20* (2020.02); *B60W 2555/60* (2020.02); *B60W 2710/18* (2013.01); *B60W 2710/20* (2013.01)

(58) Field of Classification Search
CPC ........... B60W 2520/105; B60W 10/20; B60W 2540/22; B60W 10/18; B60W 10/04; B60W 30/12; B60W 50/16; B60W 2050/143; B60W 2520/10; B60W 2540/04; B60W 30/09; B60W 50/08; B60W 2050/0295; B60W 2540/26; B60W 2710/18; B60W 2710/20; B60W 2710/10; B60W 30/095; B60W 40/09; B60W 2050/0089; B60W 2420/52; B60W 2540/24; B60W 30/143; B60W 50/0098; B60W 50/085; B60W 2040/0872; B60W 2420/403; B60W 2540/28; B60W 2540/30; B60W 30/0956; B60W 2040/0818; B60W 2050/0071; B60W 2050/0073; B60W 2550/10; B60W 2550/402; B60W 50/087; B60W 50/10; B60W 50/12; B60W 2040/0836; B60W 2040/0881; B60W 2510/18; B60W 2540/00; B60W 30/06; B60W 30/16; B60W 30/182; B60W 30/14; B60W 2050/0075; B60W 30/08; B60W 2540/043; B60W 10/184; B60W 2540/225; B60W 2050/0095; B60W 2540/223; B60W 60/0051; B60K 2370/736; B60K 28/06; B60K 2370/21; B60K 2370/175; B60K 28/02; B60K 28/04; G06K 9/00845; G06K 2009/00939; G06K 9/00221; G06K 9/00288; G06K 9/00832; G06K 9/00885; G06K 9/6267; G06K 9/00798; B60R 2300/8093; B60R 2021/23153; B60R 21/01542; B60R 21/01554; G06F 3/017; G06F 3/0227; G08B 21/06; G07C 9/00158

See application file for complete search history.

(56) References Cited

U.S. PATENT DOCUMENTS

| | | | | |
|---|---|---|---|---|
| 2015/0220792 | A1* | 8/2015 | Strauss | G06K 9/00791 382/104 |
| 2015/0336587 | A1* | 11/2015 | Inoue | B60W 50/087 701/41 |
| 2015/0346724 | A1* | 12/2015 | Jones | B60W 30/12 701/23 |
| 2016/0147222 | A1* | 5/2016 | Haberl | G06F 1/163 701/2 |

FOREIGN PATENT DOCUMENTS

| | | |
|---|---|---|
| KR | 101480786 | 1/2015 |
| KR | 1020150051550 | 5/2015 |
| KR | 1020150069741 | 6/2015 |

\* cited by examiner

[FIG. 1]
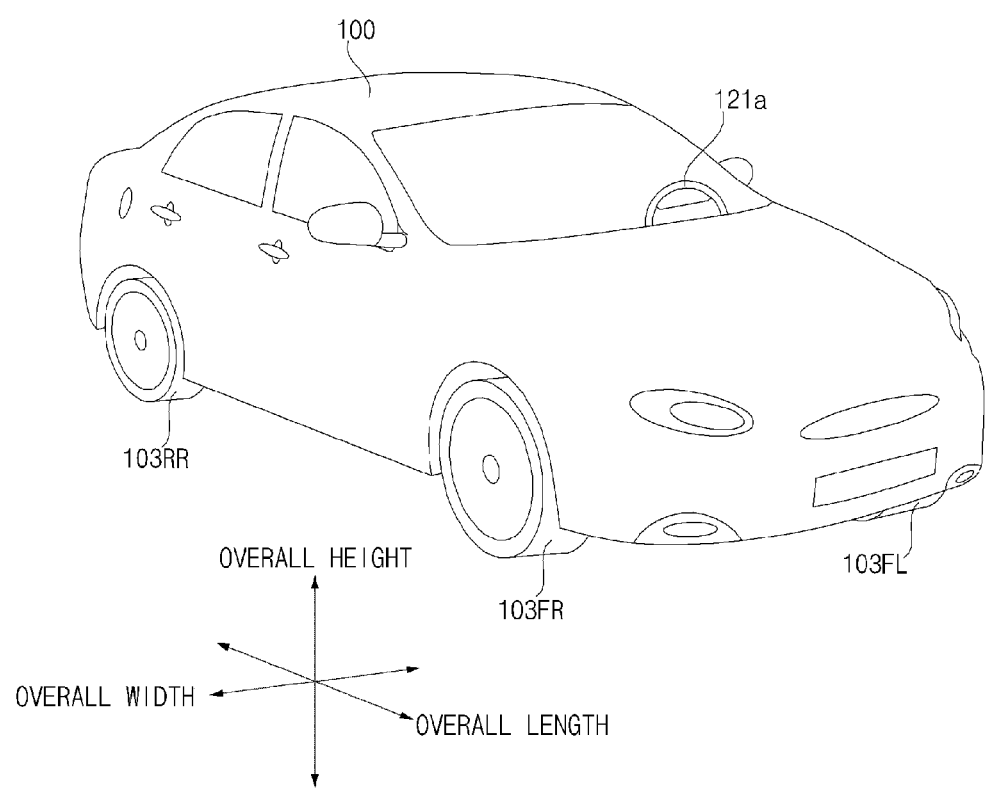

[FIG. 2a]
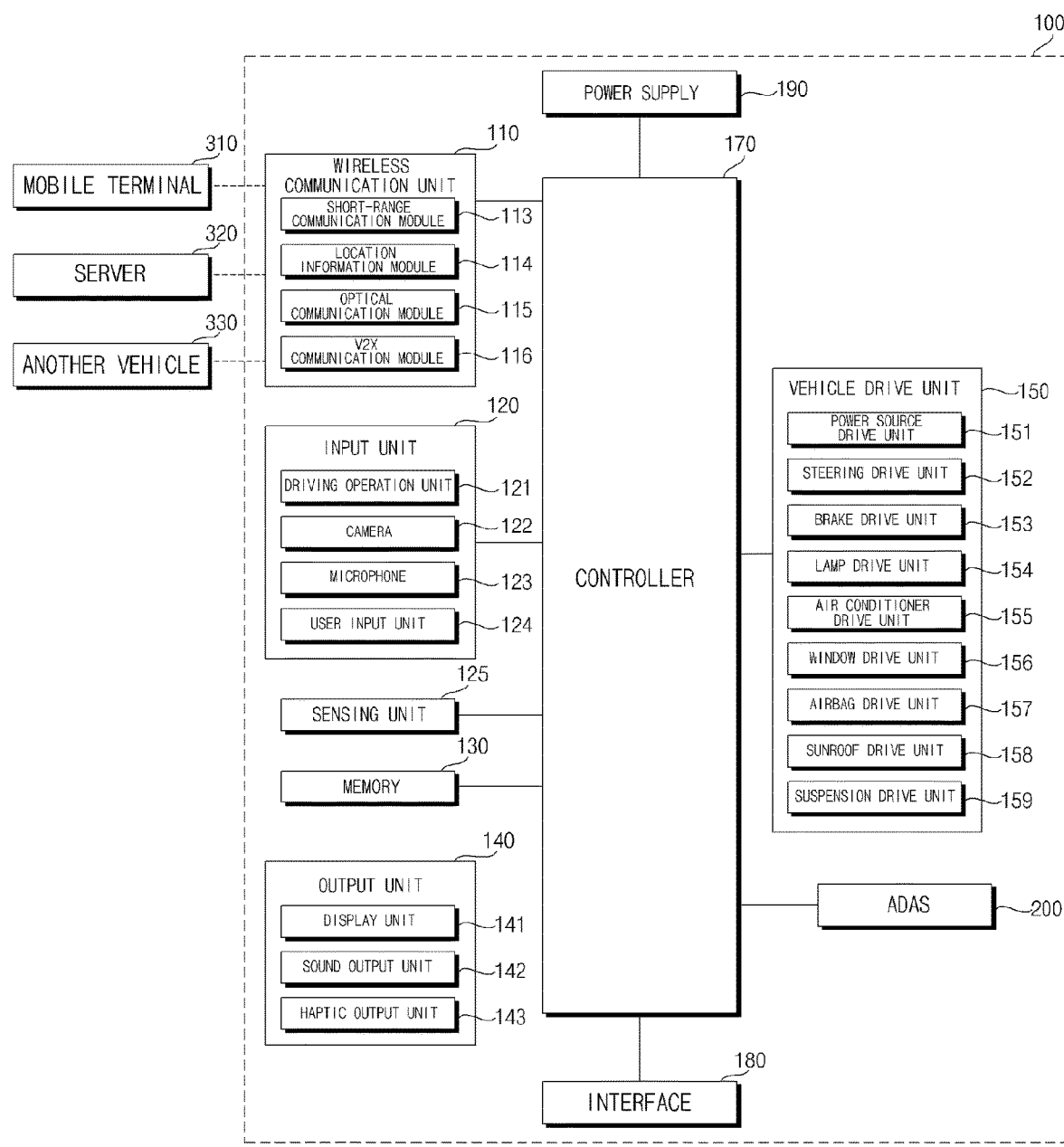

[FIG. 2b]
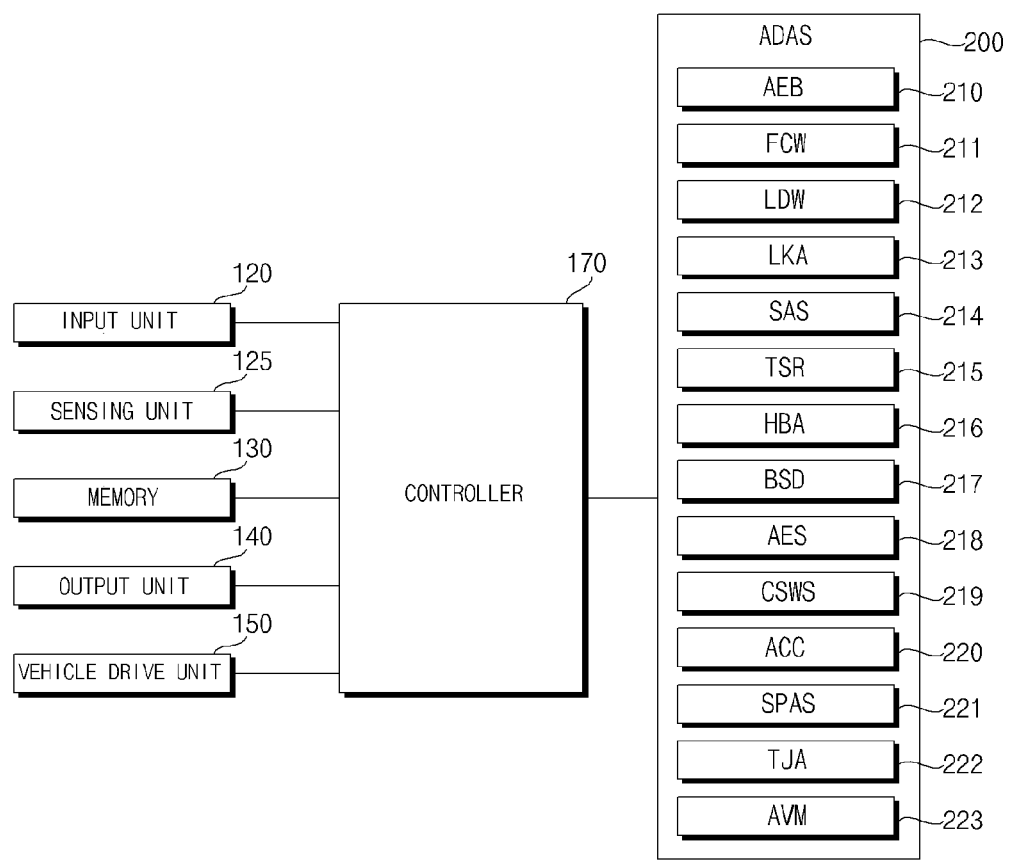

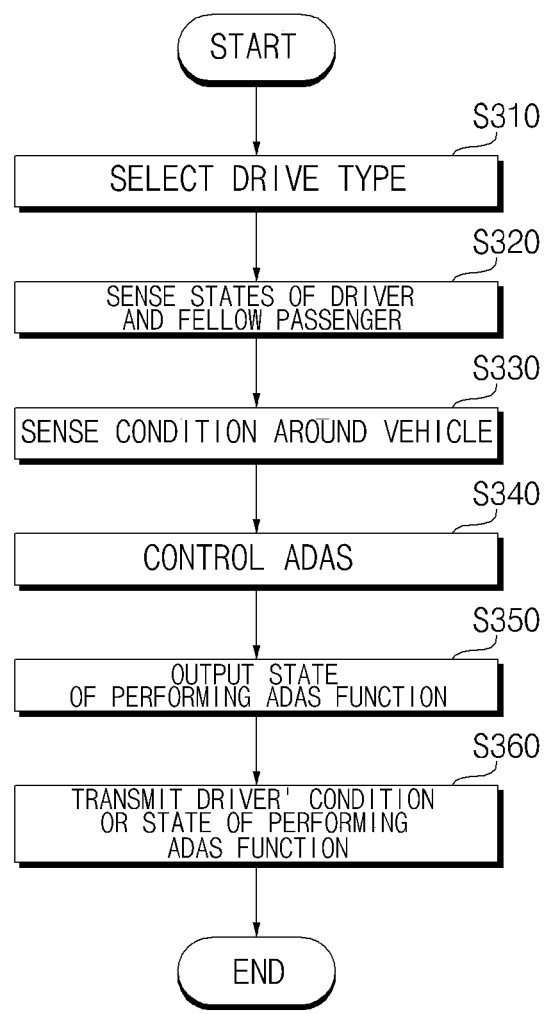

[FIG. 4]
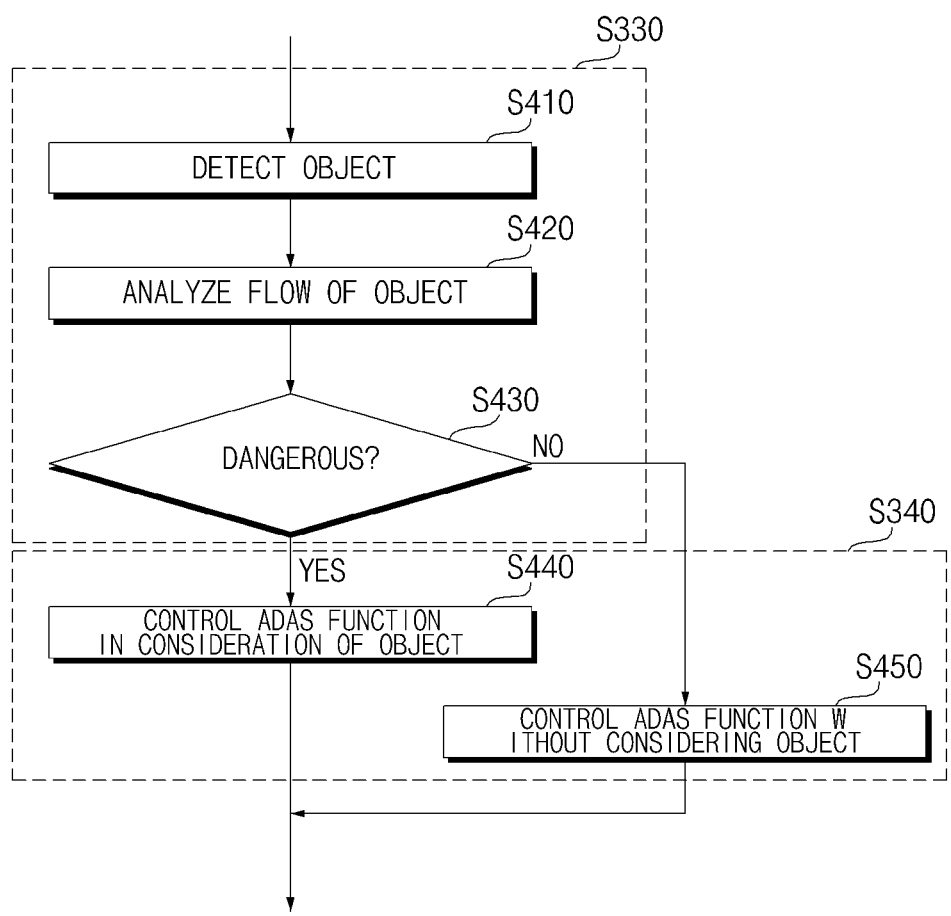

[FIG. 5]
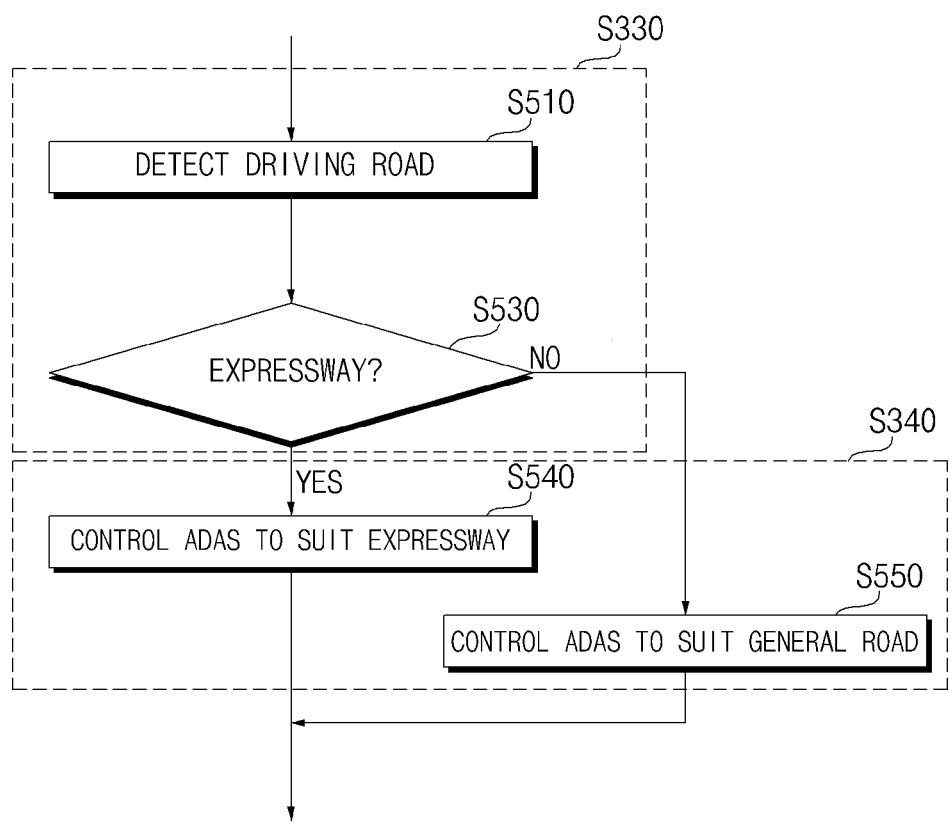

[FIG. 6]
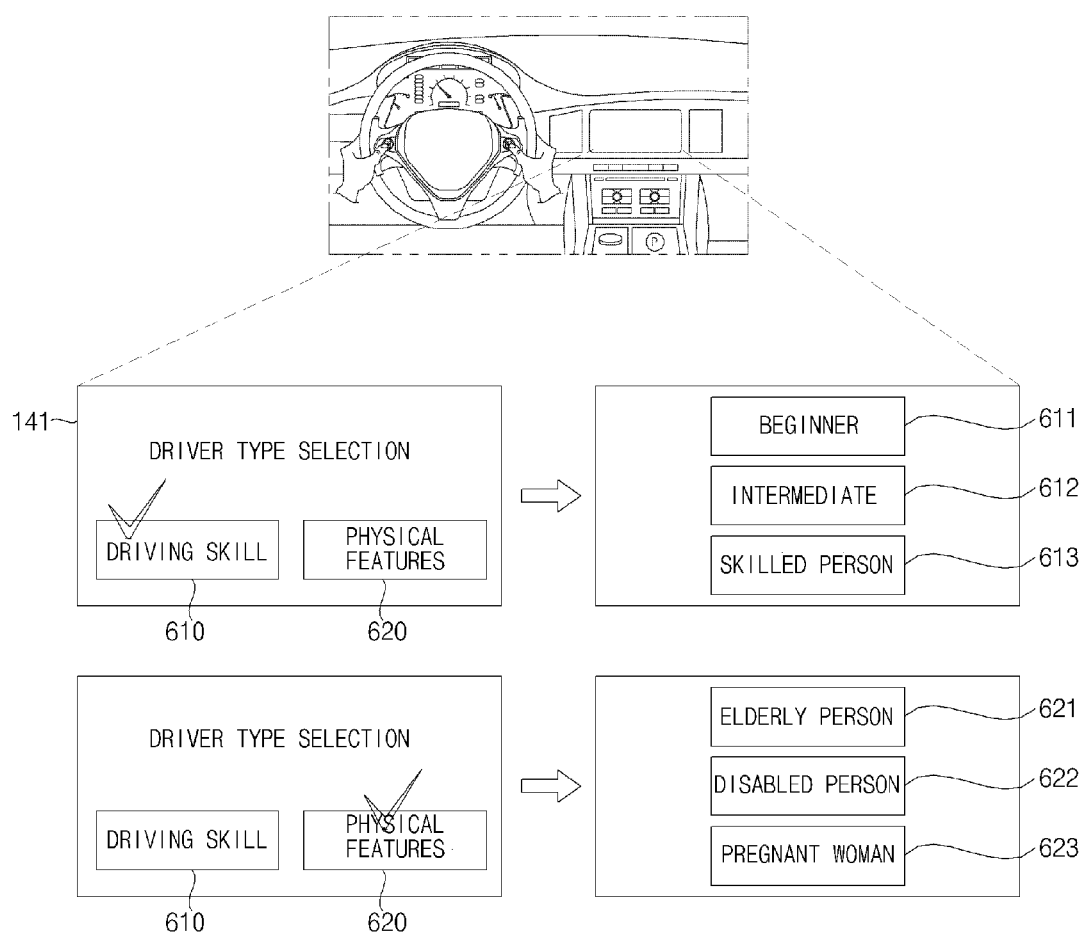

[FIG. 7]
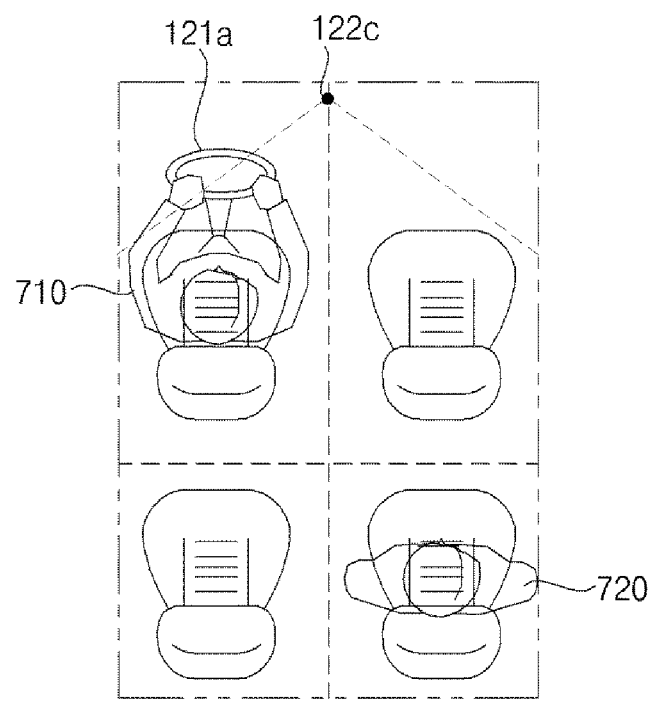

[FIG. 8]
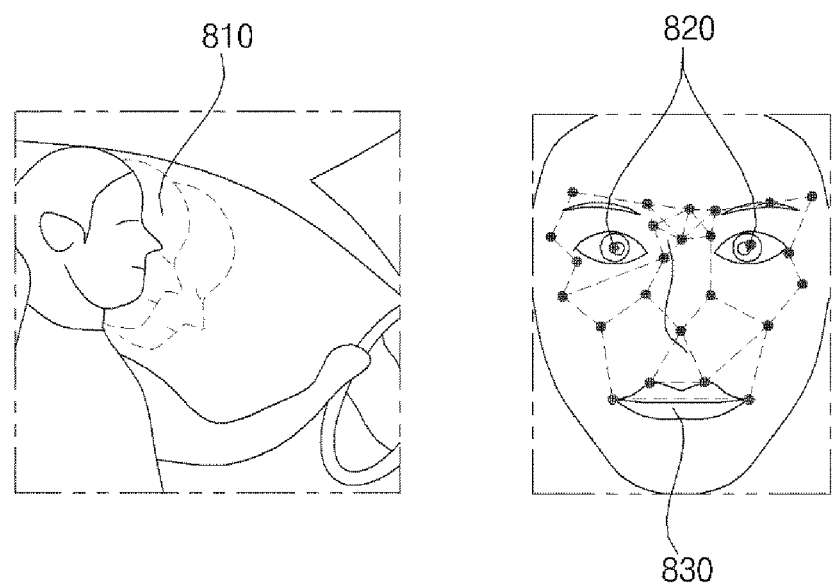

[FIG. 9]
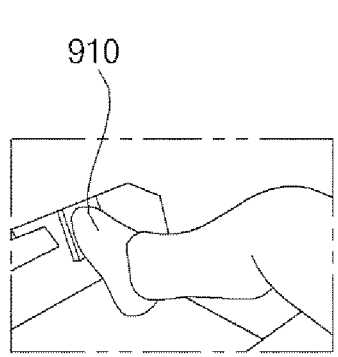
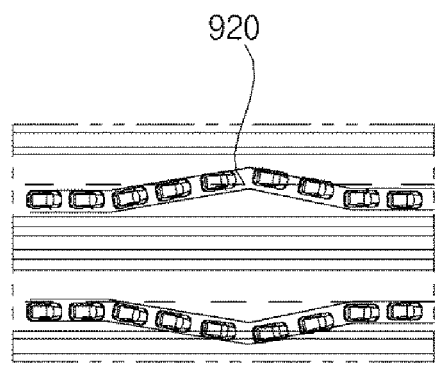

[FIG. 10]
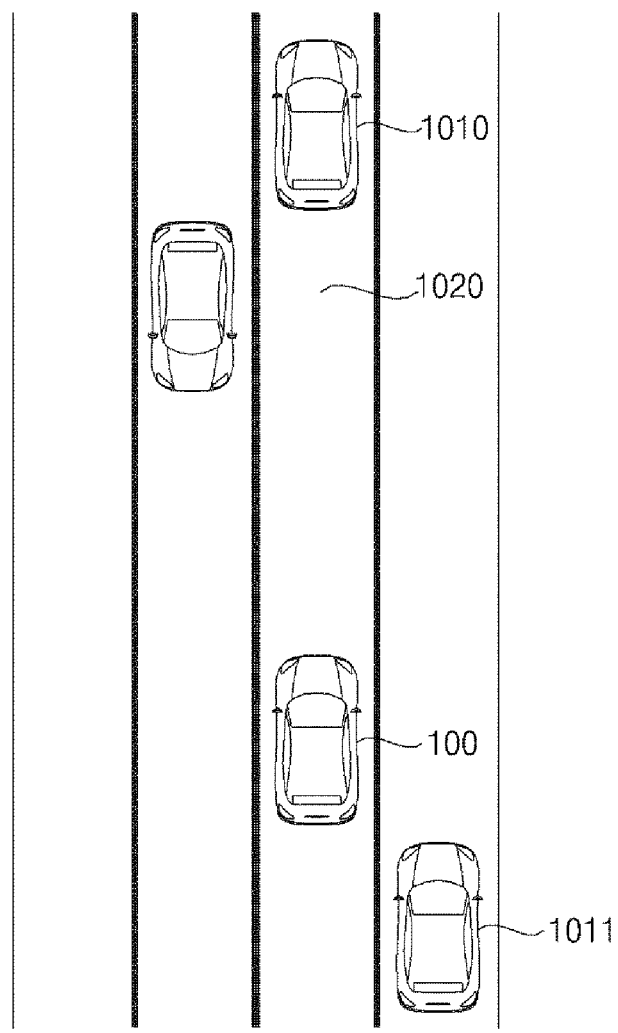

[FIG. 11]

|  | AEB | FCW | LDW | LKA | SAS | TSR | HBA | BSD | AES |
|---|---|---|---|---|---|---|---|---|---|
| Default settings | O | O | before an engine off state | X | O | X | before an engine off state | O |
| a beginner/an elderly person /a disabled person | Level 1 | Level 1 | O | O | O | O | O | O | O |
| an intermediate | Level 2 | Level 2 | O | O | X | O | X | O | O |
| a skilled person | Level 3/X | Level 3/X | X | X | X | O | X | X | X |
| a pregnant woman | X | X | O | O | X | O | O | O | O |
| User | user choice |||||||||

[FIG. 12]
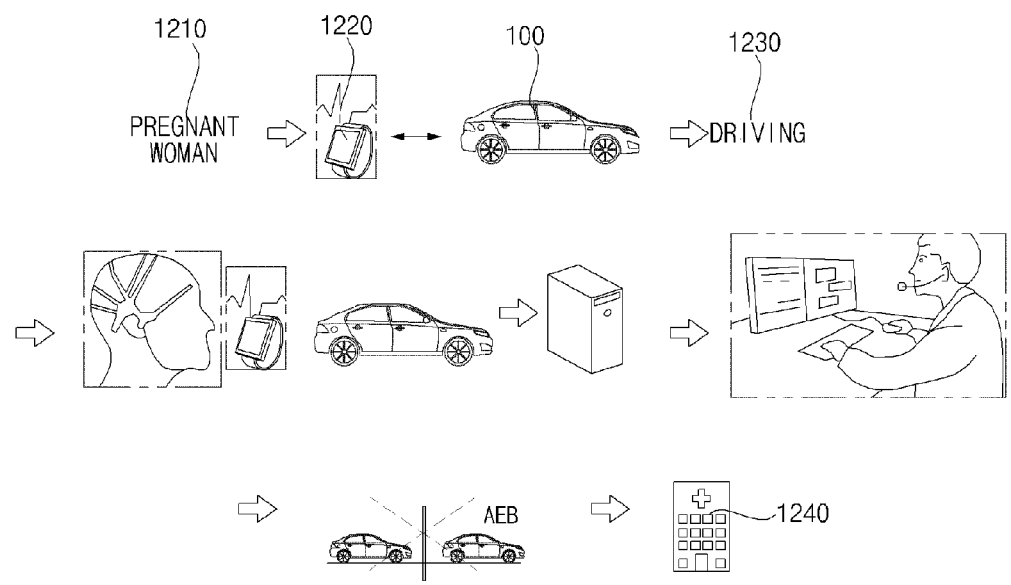

【FIG. 13a】
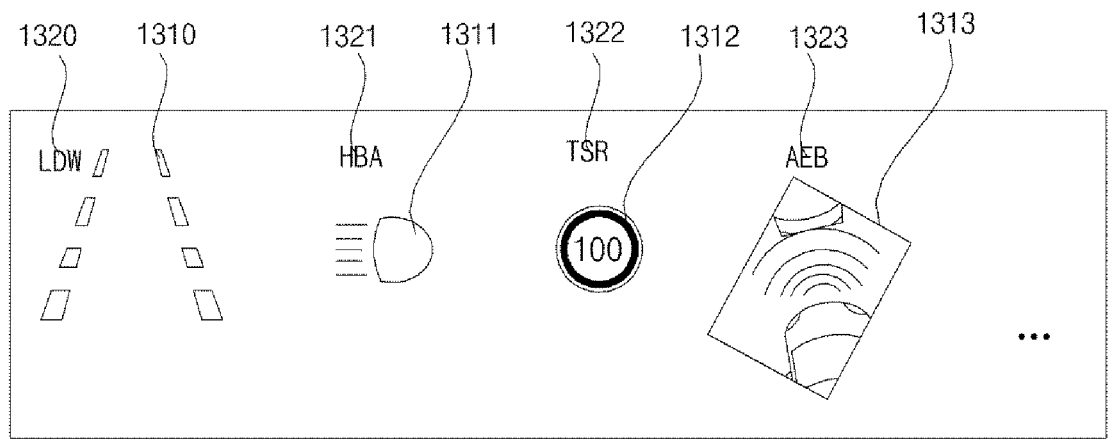

【FIG. 13b】
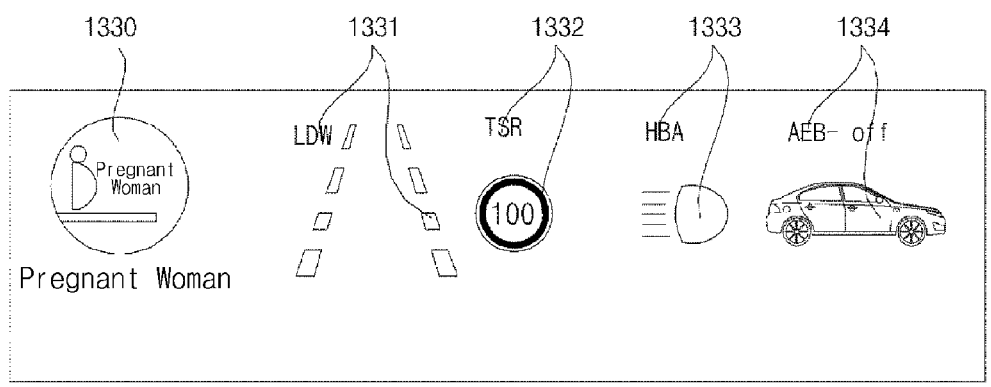

【FIG. 13c】

| notice | ADAS Functions | AUTONOMOUS DRIVING | AEB | FCW | LDW | LKA | SAS | TSR | HBA | BSD | AES |
|---|---|---|---|---|---|---|---|---|---|---|---|
| Haptic | HANDLE VIBRATION | O | O | O | O | O | O | X | X | O | O |
| | SEAT VIBRATION | O | O | O | O | O | O | X | X | O | O |
| | SAFETY BELT TIGHTENING | X | O | X | X | O | O | X | X | X | O |
| Light | EMERGENCY LIGHT ON/OFF | X | O | X | X | X | X | X | X | X | O |
| Sound | WARNING SOUND | X | O | O | O | O | O | X | X | O | O |
| | VOICE GUIDE | O | X | O | O | O | O | O | O | O | O |
| Display | CLUSTER | O | O | O | O | O | O | O | O | O | O |
| | HUD | X | X | O | O | X | X | O | X | O | X |

VEHICLE DRIVING ASSISTANCE METHOD AND VEHICLE

CROSS-REFERENCE TO RELATED APPLICATIONS

This application is the National Stage filing under 35 U.S.C. 371 of International Application No. PCT/KR2015/013829, filed on Dec. 16, 2015, which claims the benefit of earlier filing date and right of priority to Korean Application No. 10-2015-0092251, filed on Jun. 29, 2015, the contents of which are all hereby incorporated by reference herein in their entirety.

TECHNICAL FIELD

The present invention relates to a vehicle driving assistance method and a vehicle.

BACKGROUND ART

A vehicle is an apparatus that allows a user who rides therein to drive the apparatus in a desired direction. A representative example of the vehicle may be an automobile.

Meanwhile, for convenience of the user who uses the vehicle, the vehicle is provided with, for example, various sensors and electronic devices. In particular, for example, various devices for user driving convenience are being developed.

Recently, research into various advanced driver assistance systems (ADASs) has been actively conducted. Some of the ADASs may be applied to mass-produced vehicles.

Meanwhile, conventional ADASs have been individually used without considering driver type, driver state or traveling environment. In this case, an ADAS which is not requested by a user may be applied or an ADAS may not be applied when needed.

DISCLOSURE

Technical Problem

An object of the present invention devised to solve the problem lies in a vehicle driving assistance method of controlling an ADAS in stages or selectively applying an ADAS according to driver type, driver state or traveling environment.

The technical problems solved by the present invention are not limited to the above technical problems and other technical problems which are not described herein will become apparent to those skilled in the art from the following description.

Technical Solution

The object of the present invention can be achieved by providing a vehicle driving assistance method including selecting a driver type, sensing a driver's condition, and controlling at least one vehicle driving assistance function in stages or to selectively control a plurality of vehicle driving assistance functions according to the selected driver type and the sensed driver's condition.

Details of the other embodiments are included in the detailed description and the figures.

Advantageous Effects

The embodiments of the present invention include one or more of the following effects.

First, a vehicle driving assistance function is adaptively provided according to driver type or driver state without separate settings, thereby providing user convenience and driving safety.

Second, a vehicle driving assistance function is adaptively provided according to surrounding environment, thereby achieving driving safety.

Third, a vehicle driving assistance function is adaptively provided depending on whether a passenger is present, thereby providing an ADAS function suitable for an interior state of a vehicle. Therefore, it is possible to increase convenience.

Fourth, when the driver is an elderly person, a disabled person or a pregnant woman, an ADAS function specialized for each driver is provided, thereby providing convenience suitable for a special state.

The effects which can be obtained by the present invention are not limited to the above-described effects and other effects which are not described herein will become apparent to those skilled in the art from the following description.

DESCRIPTION OF DRAWINGS

FIG. 1 is a diagram showing the appearance of a vehicle according to one embodiment of the present invention.

FIGS. 2a to 2b are block diagrams showing the internal configuration of the vehicle of FIG. 1.

FIGS. 3 to 5 are flowcharts referenced to describe operation of a vehicle 100 according to an embodiment of the present invention.

FIG. 6 is a diagram referenced to describe operation of selecting a driver type according to an embodiment of the present invention.

FIGS. 7 to 9 are diagrams referenced to describe operation of sensing a driver's condition according to an embodiment of the present invention.

FIG. 10 is a diagram referenced to describe ADAS control operation according to surrounding environment according to an embodiment of the present invention.

FIG. 11 is a diagram referenced to describe ADAS function control operation based on driver type according to an embodiment of the present invention.

FIG. 12 is a diagram referenced to describe operation performed when a driver type is a pregnant woman according to an embodiment of the present invention.

FIGS. 13a to 13c are diagrams referenced to describe operation of outputting an ADAS function operation state according to an embodiment of the present invention.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" or "unit" may be used to refer to elements or components. Use of such a suffix herein is merely intended to facilitate description of the specification, and the suffix itself is not intended to have any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc. may be used herein to describe various elements of the present invention, these terms are only used to distinguish one element from another element and essential, order, or sequence of corresponding elements are not limited by these terms.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless context clearly indicates otherwise.

It will be further understood that the terms "includes" and/or "has" when used in this specification, specify the presence of stated elements, steps, operations, components, parts or a combination thereof, but do not preclude the presence or addition of one or more other elements, steps, operations, components, parts or a combination thereof.

A vehicle as described in this specification may include an automobile and a motorcycle. Hereinafter, an automobile will be focused upon.

A vehicle as described in this specification may include all of a vehicle including an engine as a power source, a hybrid vehicle including both an engine and an electric motor as a power source, and an electric vehicle including an electric motor as a power source.

In the following description, the left side of a vehicle means the left side of a traveling direction of the vehicle and the right side of the vehicle means the right side of the traveling direction of the vehicle.

In the following description, unless stated otherwise, a left-hand drive (LHD) vehicle will be focused upon. However, the present invention is also applicable to a right-hand drive (RHD) vehicle.

FIG. 1 is a diagram showing the appearance of a vehicle according to one embodiment of the present invention.

Referring to the figure, a vehicle 100 may include wheels 103FR, 103FL, 103RL, . . . rotated by a power source, and a steering input unit 121*a* for controlling the direction of travel of the vehicle 100.

The vehicle 100 may include an ADAS 200. The ADAS 200 may include a plurality of modules for controlling driving assistance functions. The plurality of modules may include processors for controlling driving assistance functions, respectively. In addition, the ADAS 200 may be electrically connected to a controller 170 to exchange data. The ADAS 200 will be described in detail with reference to FIG. 2*b*.

An overall length means a length from a front part to a rear part of the vehicle 100, an overall width means the width of the vehicle 100, and an overall height means a length from a lower part of a wheel to a roof. In the following description, an overall-length direction L may mean a direction used as a reference for measuring the overall length of the vehicle 100, an overall-width direction W may mean a direction used as a reference for measuring the overall width of the vehicle 100, and an overall-height direction H may mean a direction used as a reference for measuring the overall height of the vehicle 100.

FIGS. 2*a* to 2*b* are block diagrams showing the internal configuration of the vehicle of FIG. 1.

First, referring to FIG. 2*a*, the vehicle 100 may include a communication unit 110, an input unit 120, a sensing unit 125, a memory 130, an output unit 140, a vehicle drive unit 150, a controller 170, an interface 180, a power supply unit 190 and a vehicle driving assistance system 200.

The communication unit 110 may include a short-range communication module 113, a position information module 114, an optical communication module 115 and a V2X communication module 116.

The short-range communication module 113 is configured to facilitate short-range communication and to support short-range communication using Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 113 may establish a short-range wireless area network to perform short-range communication with at least one external device. For example, the short-range communication module 113 may wirelessly exchange data with a mobile terminal 310. The short-range communication module 113 may receive weather information and road traffic state information, e.g., Transport Protocol Experts Group (TPEG) information, from the mobile terminal 310. When a user enters the vehicle, the mobile terminal 310 of the user and the vehicle 100 may pair with each other automatically or as the user executes an application.

The position information module 114 is generally configured to acquire the position of the vehicle 100. As an example, the position information module includes a Global Position System (GPS) module. As one example, when the vehicle uses a GPS module, the position of the vehicle may be acquired using a signal sent from a GPS satellite.

Meanwhile, in some embodiments, the position information module 114 may not be included in the communication unit 110 but may be included in the sensing unit 125.

The optical communication module 115 may include a light emitting unit and a light receiving unit.

The light receiving unit may convert a light signal into an electrical signal and receive information. The light receiving unit may include a photodiode (PD) for receiving light. The photodiode may convert light into an electrical signal. For example, the light receiving unit may receive information on a preceding vehicle through light emitted from a light source included in the preceding vehicle.

The light emitting unit may include at least one light emitting element for converting electrical signals into light. Here, the light emitting element may be a Light Emitting Diode (LED). The light emitting unit converts electrical signals into light to emit the light. For example, the light emitting unit may externally emit light via flickering of the light emitting element corresponding to a prescribed frequency. In some embodiments, the light emitting unit may include an array of a plurality of light emitting elements. In some embodiments, the light emitting unit may be integrated with a lamp provided in the vehicle 100. For example, the light emitting unit may be at least one selected from among a headlight, a taillight, a brake light, a turn signal, and a sidelight. For example, the optical communication module 115 may exchange data with another vehicle 330 via optical communication.

The V2X communication module 116 performs wireless communication with a server 320 or another vehicle 330. The V2X module 116 includes a module for implementing a vehicle-to-vehicle (V2V) or vehicle-to-infrastructure (V2I) communication protocol. The vehicle 100 may perform wireless communication with an external server 320 and another vehicle 330 through the V2X communication module 116.

The input unit 120 may include a driving operation unit 121, a camera 122, a microphone 123, and a user input unit 124.

The driving operation unit 121 is configured to receive user input for driving of the vehicle 100. The driving operation unit 121 may include a steering input unit 121a, a shift input unit 121b, an acceleration input unit 121c, and a brake input unit 121d.

The steering input unit 121a is configured to receive user input with regard to the direction of travel of the vehicle 100. The steering input unit 121a may include a steering wheel. In some embodiments, the steering input unit 121a may be configured as a touchscreen, a touch pad, or a button.

The shift input unit 121b is configured to receive input for selecting one of Park (P), Drive (D), Neutral (N), and Reverse (R) gears of the vehicle 100 from the user. The shift input unit 121b may take the form of a lever. In some embodiments, the shift input unit may be configured as a touchscreen, a touch pad, or a button.

The acceleration input unit 121c is configured to receive user input for acceleration of the vehicle 100. The brake input unit 121d is configured to receive user input for speed reduction of the vehicle 100. Each of the acceleration input unit 121c and the brake input unit 121d may take the form of a pedal. In some embodiments, the acceleration input unit 121c or the brake input unit 121d may be configured as a touchscreen, a touch pad, or a button.

The camera 122 may include an image sensor and an image processing module. The camera 122 may process a still image or a moving image acquired through the image sensor (e.g., CMOS or CCD). The image processing module may process a still image or a moving image acquired through the image sensor, extract necessary information and deliver the extracted information to the controller 170.

Meanwhile, the vehicle 100 may include a front camera 122a for capturing a front image of the vehicle, an around view camera 122b for capturing an image around the vehicle and an internal camera 122c for capturing an image of the interior of the vehicle. Each of the cameras 122a, 122b and 122c may include a lens, an image sensor and a processor. The processor may perform computer processing with respect to the captured images, generate data or information, and deliver the generated data or information to the controller 170.

The processor included in the camera 122 may be controlled by the controller 170. The processor included in the camera 122 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for the implementation of other functions.

The front camera 122a may include a stereo camera. In this case, the processor of the camera 122a may detect a distance from an object, a relative speed with an object detected from an image, and a distance between a plurality of objects, using a disparity difference detected from a stereo image.

The front camera 122a may include a time-of-flight (TOF) camera. In this case, the camera 122 may include a light source (e.g., infrared or laser) and a reception unit. In this case, the processor of the camera 122a may detect a distance from an object, a relative speed with an object detected from an image, and a distance between a plurality of objects based on a time (TOF) required to reflect infrared or laser emitted from a light source from an object and to receive the reflected infrared or laser.

The around view camera 122b may include a plurality of cameras. For example, the plurality of cameras may be provided at the left, rear, right and front sides of the vehicle.

The left camera may be provided inside a case surrounding a left side mirror. Alternatively, the left camera may be provided outside the case surrounding the left side mirror. Alternatively, the left camera may be located on a left front door, a left rear door or an outer part of a left fender.

The right camera may be provided inside a case surrounding a right side mirror. Alternatively, the right camera may be provided outside the case surrounding the right side mirror. Alternatively, the right camera may be located on a right front door, a right rear door or an outer part of a right fender.

The rear camera may be provided around a rear license plate, a trunk or a tailgate switch.

The front camera may be located around a radiator grille or an emblem.

The images captured by the plurality of cameras may be delivered to the processor of the camera 122b and the processor may synthesize the images to generate an image around the vehicle. At this time, the image around the vehicle may be displayed on the display 141 as a top-view image or a bird's eye image.

The internal camera 122c may capture the image of the internal space of the vehicle 100. The internal camera 122c may acquire an image of a passenger.

The processor of the internal camera 122c may acquire the image of the passenger of the vehicle 100 and detect the number of passengers and in which seat the passengers sit. For example, the internal camera 122c may detect whether a fellow passenger gets into the vehicle and in which seat the fellow passenger sits.

The internal camera 122c may acquire a biometric image of a passenger. The processor of the internal camera 122c may check the ID of the passenger based on the facial image of the passenger.

Meanwhile, in some embodiments, the processor of the internal camera 122c may detect the type of the passenger based on the image of the passenger. For example, the processor of the internal camera 122c may detect whether the type of the driver is an elderly person, a disabled person or a pregnant woman using a predetermined image processing algorithm.

The microphone 123 may process external sound signals into electrical data. The processed data may be utilized in various ways according to a function that the vehicle 100 is performing. The microphone 123 may convert a user voice command into electrical data. The converted electrical data may be transmitted to the controller 170.

Meanwhile, in some embodiments, a camera 122 or the microphone 123 may not be included in the input unit 120 but may be included in the sensing unit 125.

The user input unit 124 is configured to receive information from the user. When information is input via the user input unit 124, the controller 170 may control the operation of the vehicle 100 to correspond to the input information. The user input unit 124 may include a touch input unit or a mechanical input unit. In some embodiments, the user input unit 124 may be located in a region of the steering wheel. In this case, drivers may operate the user input unit 124 with their fingers while gripping the steering wheel.

The sensing unit 125 is configured to sense signals associated with, for example, various states of the vehicle 100. To this end, the sensing unit 125 may include a collision sensor, a wheel sensor, a speed sensor, gradient sensor, a weight sensor, a heading sensor, a yaw sensor, a gyro sensor, a position module, a vehicle forward/reverse sensor, a battery sensor, a fuel sensor, a tire sensor, a steering sensor based on rotation of the steering wheel, a vehicle interior temperature sensor, a vehicle interior humidity sensor, an ultrasonic sensor, an illuminance sensor, a radar, a Lidar, etc.

As such, the sensing unit 125 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle information, information on external illuminance of the vehicle, etc.

Meanwhile, the sensing unit 125 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The position information module 114 may be classified as a subcomponent of the sensing unit 125. The camera 122 may be classified as a subcomponent of the sensing unit 125.

The memory 130 is electrically connected to the controller 170. The memory 130 may store basic data of the unit, control data for operation control of the unit and input/output data. The memory 130 may be various storage apparatuses, which are implemented in a hardware manner, such as a ROM, RAM, EPROM, flash drive and hard drive. The memory 130 may store a variety of data for overall operation of the vehicle 100, such as a program for processing or control of the controller 170.

The output unit 140 is configured to output information processed in the controller 170. The output unit 140 may include a display unit 141, a sound output unit 142, and a haptic output unit 143.

The display unit 141 may display information processed in the controller 170. For example, the display unit 141 may display vehicle associated information. Here, the vehicle associated information may include vehicle control information for direct control of the vehicle or driver assistance information for guiding driving of the vehicle. In addition, the vehicle associated information may include vehicle state information that indicates the current state of the vehicle or vehicle traveling information regarding traveling of the vehicle.

The display unit 141 may include at least one selected from among a Liquid Crystal Display (LCD), a Thin Film Transistor LCD (TFT LCD), an Organic Light Emitting Diode (OLED) display, a flexible display, a 3D display, and an e-ink display.

The display unit 141 may configure an interlayer structure with a touch sensor, or may be integrally formed with the touch sensor to implement a touchscreen. The touchscreen may function as the user input unit 724 which provides an input interface between the vehicle 100 and the user and also function to provide an output interface between the vehicle 100 and the user. In this case, the display unit 141 may include a touch sensor which senses a touch to the display unit 141 so as to receive a control command in a touch manner. When a touch is input to the display unit 141 as described above, the touch sensor may sense the touch and the controller 170 may generate a control command corresponding to the touch. Content input in a touch manner may be characters or numbers, or may be, for example, instructions in various modes or menu items that may be designated.

Meanwhile, the display unit 141 may include a cluster to allow the driver to check vehicle state information or vehicle traveling information while driving the vehicle. The cluster may be located on a dashboard. In this case, the driver may check information displayed on the cluster while looking forward.

Meanwhile, in some embodiments, the display unit 141 may be implemented as a head up display (HUD). When the display unit 141 is implemented as a HUD, information may be output via a transparent display provided at the windshield. Alternatively, the display unit 141 may include a projector module to output information via an image projected onto the windshield.

In some embodiments, the display unit 141 may include a transparent display. In this case, the transparent display may be attached to the windshield.

The transparent display may display a predetermined screen with predetermined transparency. The transparent display may include at least one of a transparent thin film electroluminescent (TFEL) display, a transparent organic light emitting diode (OLED) display, a transparent liquid crystal display (LCD), a transmission-type transparent display and a transparent light emitting diode (LED) display. Transparency of the transparent display may be adjusted.

The sound output unit 142 is configured to convert electrical signals from the controller 170 into audio signals and to output the audio signals. To this end, the sound output unit 142 may include, for example, a speaker. The sound output unit 142 may output sound corresponding to the operation of the user input unit 724.

The haptic output unit 143 is configured to generate tactile output. For example, the haptic output unit 143 may operate to vibrate a steering wheel, a safety belt, or a seat so as to allow the user to recognize an output thereof.

The vehicle drive unit 150 may control the operation of various devices of the vehicle. The vehicle drive unit 150 may include at least one of a power source drive unit 151, a steering drive unit 152, a brake drive unit 153, a lamp drive unit 154, an air conditioner drive unit 155, a window drive unit 156, an airbag drive unit 157, a sunroof drive unit 158, and a suspension drive unit 159.

The power source drive unit 151 may perform electronic control of a power source inside the vehicle 100.

For example, in the case where a fossil fuel based engine (not illustrated) is a power source, the power source drive unit 151 may perform electronic control of the engine. As such, the power source drive unit 151 may control, for example, an output torque of the engine. In the case where the power source drive unit 151 is an engine, the power source drive unit 151 may control the speed of the vehicle by controlling the output torque of the engine under the control of the controller 170.

In another example, in the case where an electric motor (not illustrated) is a power source, the power source drive unit 151 may perform control of the motor. As such, the power source drive unit 151 may control, for example, the RPM and torque of the motor.

The steering drive unit 152 may perform electronic control of a steering apparatus inside the vehicle 100. The steering drive unit 152 may change the direction of travel of the vehicle.

The brake drive unit 153 may perform electronic control of a brake apparatus (not illustrated) inside the vehicle 100. For example, the brake drive unit 153 may reduce the speed of the vehicle 100 by controlling the operation of brakes located at wheels. In another example, the brake drive unit 153 may adjust the direction of travel of the vehicle 100 leftward or rightward by differentiating the operation of respective brakes located at left and right wheels.

The lamp drive unit 154 may turn at least one lamp arranged inside and outside the vehicle 100 on or off. In addition, the lamp drive unit 154 may control, for example, the intensity and direction of light of each lamp. For example, the lamp drive unit 154 may perform control of a turn signal lamp or a brake lamp.

The air conditioner drive unit 155 may perform electronic control of an air conditioner (not illustrated) inside the vehicle 100. For example, when the interior temperature of the vehicle 100 is high, the air conditioner drive unit 155 may operate the air conditioner to supply cold air to the interior of the vehicle 100.

The window drive unit 156 may perform electronic control of a window apparatus inside the vehicle 100. For example, the window drive unit 156 may control opening or closing of left and right windows of the vehicle.

The airbag drive unit 157 may perform the electronic control of an airbag apparatus inside the vehicle 100. For example, the airbag drive unit 157 may control an airbag to be deployed in a dangerous situation.

The sunroof drive unit 158 may perform electronic control of a sunroof apparatus (not illustrated) inside the vehicle 100. For example, the sunroof drive unit 158 may control opening or closing of a sunroof.

The suspension drive unit 159 may perform electronic control of a suspension apparatus (not shown) inside the vehicle 100. For example, when a road surface is uneven, the suspension drive unit 159 may control the suspension apparatus to reduce vibration of the vehicle 100.

The controller 170 may control the overall operation of each unit inside the vehicle 100. The controller 170 may be referred to as an Electronic Control Unit (ECU).

The controller 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for the implementation of other functions.

The interface 180 may serve as a passage for various kinds of external devices that are connected to the vehicle 100. For example, the interface 180 may have a port that is connectable to the mobile terminal 310 and may be connected to the mobile terminal 310 via the port. In this case, the interface 180 may exchange data with the mobile terminal 310.

The interface 180 may serve as a passage for providing electric energy to the connected mobile terminal 310. When the mobile terminal 310 is electrically connected to the interface 180, the interface 180 may provide electric energy supplied from the power supply unit 190 to the mobile terminal 310 under control of the controller 170.

The power supply unit 190 may supply power required to operate the respective components under the control of the controller 170. In particular, the power supply unit 190 may receive power from, for example, a battery (not illustrated) inside the vehicle 100.

Next, the ADAS 200 will be described with reference to FIG. 2b.

The ADAS (Advanced Driver Assistance System) 200 is a system for assisting a driver in order to provide convenience and safety.

The ADAS 200 may include an autonomous emergency braking (AEB) module 210, a forward collision warning (FCW) module 211, a lane departure warning (LDW) module 212, a lane keeping assist (LKA) module 213, a speed assist system (SAS) module 214, a traffic sign recognition (TSR) module 215, an adaptive high beam assist (HBA) module 216, a blind spot detection (BSD) module 217, an autonomous emergency steering (AES) module 218, a curve speed warning system (CSWS) module 219, an adaptive cruise control (ACC) module 220, a smart parking assist system (SPAS) module 221, a traffic jam assist (TJA) 222 and an around view monitor (AVM) module 223.

Each of the ADAS modules 210, 211, 212, 213, 214, 215, 216, 217, 218, 219, 220, 221, 222 and 223 may include a processor for controlling a vehicle driving assistance function.

The processor included in each of the ADAS modules 210, 211, 212, 213, 214, 215, 216, 217, 218, 219, 220, 221, 222 and 223 may be controlled by the controller 170.

The processor of each of the ADAS modules 210, 211, 212, 213, 214, 215, 216, 217, 218, 219, 220, 221, 222 and 223 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for the implementation of other functions.

The AEB module 210 controls autonomous braking in order to prevent collision with a detected object.

The FCW module 211 performs control to output a warning in order to prevent collision with an object located at a front side of the vehicle.

The LDW module 212 performs control to output a warning in order to prevent lane departure while traveling.

The LKA module 213 performs control to keep a driving lane while traveling.

The SAS module 214 performs control to maintain a predetermined speed or less.

The TSR module 215 senses a traffic signal while traveling and provides information based on the sensed traffic signal.

The HBA module 216 controls the irradiation range or amount of high beams according to a traveling situation.

The BSD module 217 detects an object located beyond a driver's view while traveling and providing detection information.

The AES module 218 autonomously performs steering in emergency.

The CSWS 219 performs control to output a route when the vehicle travels on a curve at a predetermined speed or more.

The ACC module 220 performs control to follow a preceding vehicle.

The SPAS module 221 detects a parking space and performs control to park in the parking space.

The TJA module 222 performs control to perform autonomous driving upon encountering a traffic jam.

The AVM 223 provides an image around the vehicle and performs control to monitor the vicinity of the vehicle.

The ADAS 200 may provide a control signal for performing a vehicle driving assistance function to the output unit 140 or the vehicle drive unit 150 based on the data acquired by the input unit 120 or the sensing unit 125. The ADAS 200 may directly output the control signal to the output unit 140 or the vehicle drive unit 150 through an in-vehicle network communication (e.g., CAN). Alternatively, the ADAS 200 may output the control signal to the output unit 140 or the vehicle drive unit 150 through the controller 170.

FIGS. 3 to 5 are flowcharts referenced to describe operation of a vehicle 100 according to an embodiment of the present invention.

Referring to FIG. 3, the controller 170 may select a driver type (S310).

The driver type may be divided according to the driving skill or physical features of a driver.

For example, the driver type may be divided into a beginner, an intermediate and a skilled person according to the driving skill of the driver.

For example, the driver type may be divided into an elderly person, a disabled person and a pregnant woman according to the physical features of the driver.

The driver type may be selected according to user input. Specifically, the controller 170 may select the driver type according to an input signal received by the input unit 120.

Meanwhile, when an input signal for selecting the driver type is not received, the controller 170 may control the vehicle driving assistance function according to default settings. Here, default settings may be determined upon manufacturing the vehicle 100 and on, off or stepwise settings of the functions of the ADAS 200.

The driver type may be selected based on data pre-stored in the memory 130.

If the vehicle 100 has a means for checking the ID of the driver, the driving skill of the driver may be selected through the data pre-stored in the memory 130 corresponding to the ID of the checked driver. Here, the means for checking the ID of the driver may refer to a means for reading the unique biometric information of the driver and checking the ID of the driver. For example, the ID checking means may include an iris recognition means, a fingerprint recognition means and a voice recognition means.

The memory 130 may accumulate and store the driving pattern of the driver. The controller 170 may select the driver type according to the driving skill based on the driving pattern of the driver, the ID of which is checked, among the stored driving patterns.

The driver type may be selected based on the image of the driver acquired by the internal camera 122*c*. The controller 170 may select the driver type according to the physical features of the driver based on the feature points detected from the image of the driver acquired by the internal camera 122*c*.

In a state of selecting the driver type, the controller 170 may sense the driver's condition (S320).

The driver's condition may be sensed through analysis of the image of the driver captured by the internal camera 122*c*.

For example, the processor of the internal camera 122*c* may detect the driver from the captured image of the interior of the vehicle, analyze the operation or facial image of the detected driver and check the driver's condition.

For example, the controller 170 may receive the image of the interior of the vehicle captured by the internal camera 122*c*, detect the driver, analyze the operation or facial image of the detected driver, and check the driver's condition.

The driver's condition may be sensed through driving pattern analysis.

The controller 170 may analyze the driving pattern of the driver based on the sensing information received from the sensing unit 125. The controller 170 may check the driver's condition through the analyzed driving pattern.

Meanwhile, upon sensing the driver's condition, the controller 170 may sense a fellow passenger.

The fellow passenger may be sensed through analysis of the image of the fellow passenger captured through the internal camera 122*c*.

For example, the processor of the internal camera 122*c* may detect whether a fellow passenger gets into the vehicle and in which seat the fellow passenger sits from the captured image of the interior of the vehicle.

For example, the controller 170 may receive the image of the interior of the vehicle captured by the internal camera 122*c* and may detect whether a fellow passenger gets into the vehicle and in which seat the fellow passenger sits.

In a state of sensing the driver's condition, the controller 170 may sense the conditions around the vehicle (S330).

The controller 170 may sense the conditions around the vehicle through the sensing unit 125.

The conditions around the vehicle may be sensed through analysis of the image captured by the front camera 122*a* or the around view camera 122*b*.

The conditions around the vehicle may be sensed through image processing of the processor of the front camera 122*a* or the processor of the around view camera 122*b*.

Alternatively, the conditions around the vehicle may be sensed by processing the image received from the front camera 122*a* or the around view camera 122*b* at the controller 170.

Here, the conditions around the vehicle may be related to an object located near the vehicle 100, a driving road, illuminance or weather.

In a state of selecting the driver type and sensing the driver's condition and the conditions around the vehicle, the controller 170 may control the ADAS 200 based on at least one of the driver type, the driver's condition and the conditions around the vehicle (S340).

The controller 170 may control at least one function of the ADAS 200 in stages according to at least one of the selected driver type, the sensed driver's condition, the conditions around the vehicle and the sensed fellow passenger.

For example, the controller 170 may control the function of the AEB 210 divided into three steps. Specifically, the controller 170 may control the AEB 210 to be divided into three steps according to the distance from a detected object after emergency braking. In a first step, the controller 170 may perform quick braking to maintain the distance from a front object by a first distance. In a second step, the controller 170 may perform emergency braking to maintain the distance from the front object by a second distance. In a third step, the controller 170 may perform emergency braking to maintain the distance from the front object by a third distance.

The controller 170 may selectively control the plurality of functions of the ADAS 200 according to the selected driver type and the sensed driver's condition.

For example, if the driver type is a skilled person, the controller 170 may selectively perform control to turn off the functions of the AEB 210, the FCW 211, the LDW 212, the LKA 213, the SAS 214, the HBA 216, the BSD 217 and the AES 218 and to turn on the function of the TSR 215.

For example, if a fellow passenger is sensed, the controller 170 may control the function of the ADAS 200 depending on whether a fellow passenger enters the vehicle and in which seat the fellow passenger sits. If a fellow passenger sits on a seat located behind a passenger seat, the controller 170 may selectively control the function of the ADAS 200 to give a comfortable ride.

For example, in this case, the controller 170 may set a time to collision (TTC) as an operation condition of the AEB 210 or the FCW 211 to a first time and perform braking earlier than a general condition upon detecting an object, thereby enabling smooth braking.

For example, if the selected driver type is an elderly person or a disabled person, the controller 170 may perform control to turn all functions of the ADAS 200 on. An elderly driver or a disabled driver may have trouble driving the vehicle or may not appropriately deal with a situation. In this case, by turning all functions of the ADAS 200 on, it is possible to realize comfortable and safe driving.

For example, if the selected driver type is a pregnant woman, the controller 170 may perform control to turn an emergency braking function of the ADAS 200 off. For example, the controller 170 may perform control to turn off the functions of the AEB 210, the FCW 211 and the SAS 214 for performing emergency braking of the ADAS 200. When a pregnant woman drives the vehicle, it is possible to prevent the pregnant woman and the fetus thereof from being endangered due to emergency braking.

Meanwhile, the controller 170 may control the functions of the ADAS 200 according to the sensed illuminance or weather.

Meanwhile, the controller 170 may perform control to turn some functions of the ADAS 200 on regardless of the driver type, the driver's condition and the conditions around the vehicle. For example, the controller 170 may perform control to turn the TSR 215 on while traveling.

Meanwhile, when the controller 170 controls the ADAS 200, the sensed driver's condition may have precedence over the selected driver type as a control condition.

Although the driver is a skilled person, when drowsiness of the driver is sensed, the controller 170 may perform control of the ADAS 200 according to the drowsiness of the driver prior to control of the ADAS 200 according to the skilled person.

Meanwhile, in some embodiments, in the case of an autonomous vehicle, the controller 170 may enter an autonomous driving mode based on at least one of the driver type, the driver's condition and the conditions around the vehicle.

After ADAS control, the controller 170 may output a state of performing a function of an ADAS through the output unit 140 or the lamp drive unit 154 (S350).

Specifically, the controller 170 may display the performed function of the ADAS 200 through the display unit 141. In this case, the controller 170 may display whether the function of the ADAS 200 is performed through a HUD or a transparent display.

The controller 170 may output the performed functions of the ADAS 200 through the audio output unit 142. In this case, the controller 170 may output sound or warning sound to indicate whether the function of the ADAS 200 is performed.

The controller 170 may output the performed function of the ADAS 200 through the haptic output unit 143. In this case, the controller 170 may output vibrations of the steering wheel, the seat or the safety belt to indicate whether the function of the ADAS 200 is performed.

Thereafter, the controller 170 may transmit the driver's condition and the state of performing the function of the ADAS to another device (S360).

Here, the driver's condition is sensed in step S320.

The controller 170 may transmit the driver's condition or the state of performing the function of the ADAS to a mobile terminal 310, a server 320 and another vehicle 320 through the communication unit 110.

The server 320 may be a traffic control server. Another vehicle 320 may travel around the vehicle 100.

For example, the controller 170 may transmit the operation state of the AEB 210 to another following vehicle 320 through the optical communication module 115 or the V2X communication module 116. In this case, the operation state of the AEB 210 is transmitted to the following vehicle, thereby ensuring a time required for the following vehicle to prepare for an accident.

FIGS. 4 to 5 are flowcharts referenced to describe detailed operation of steps S350 and S360 of FIG. 3 according to the embodiment of the present invention.

The controller 170 may control the vehicle driving assistance function according to the conditions around the vehicle. Here, the conditions around the vehicle may include the flow of an object around the vehicle, a driving road, illuminance or weather.

Referring to FIG. 4, the controller 170 may detect an object around the vehicle (S410). The controller 170 may detect an object from the image acquired by the front camera 122*a* or the around view camera 112*b*. Here, the object may be an obstacle which may cause an accident, such as a peripheral vehicle, a pedestrian, a two-wheeled vehicle, a structure, etc.

Meanwhile, the controller 170 may detect a distance from the object or a relative speed using the above-described disparity difference or TOF.

In a state of detecting the object, the controller 170 may analyze the flow of the object (S420). For example, the controller 170 may analyze whether the object is approaching the vehicle 100 or how fast the object approaches the vehicle.

The controller 170 may determine whether the object is a dangerous element based on the result of analyzing the flow of the object (S430).

Here, determination as to whether the object is a dangerous element may be made based on at least one of the position of the object, change in movement of the object, and the distance from and the relative speed of the object.

Upon determining that the object is a dangerous element, the controller 170 may control the ADAS 200 in consideration of the object in addition to the driver type and the driver's condition (S440).

Upon determining that the object is not a dangerous element, the controller 170 may control the ADAS 220 without considering the object (S450).

Meanwhile, although operation of steps S410 to S430 is described as being performed by the controller 170 in the present embodiment, the present invention is not limited thereto and the operation may be performed by the processor of the camera 122.

Meanwhile, steps S410 to S430 may be included in step S330 of FIG. 3. In addition, steps S440 to S450 may be included in step S340 of FIG. 3.

Referring to FIG. 5, the controller 170 may detect a driving road (S510). The controller 170 may detect the driving road from the image acquired by the front camera 122*a* or the around view camera 122*b*.

In a state of detecting the driving road, the controller 170 may determine whether the driving road is an expressway or a general road (S530).

For example, the controller 170 may determine whether the vehicle 100 travels on an expressway or a general road based on at least one of a tollgate, a pedestrian, a two-wheeled vehicle, trees, a signpost, a speed limit sign, a traffic sign and road display information.

When the driving road is an expressway, the controller 170 may control the ADAS 200 to suit the expressway. (S540).

For example, when the vehicle travels on the expressway, the controller 170 may turn the functions of the ADAS 200 related to lane keeping, cruise control and following a preceding vehicle on. Specifically, the controller 170 may turn on the LDW 212, the LKA 213, the SAS 214, the CSWS 219 and the ACC 220.

When the vehicle travels on the expressway, the function of the ADAS 200 related to lane keeping is turned on, thereby keeping the lane.

When the vehicle travels on the expressway, the function of the ADAS 200 related to cruise control is turned on, thereby preventing speeding.

When the vehicle travels on the expressway, the function of the ADAS 200 related to following a preceding vehicle is turned on, thereby providing convenience to the driver.

For example, when the vehicle travels on the expressway, the controller 170 may adjust the step of the function of the ADAS 200 related to provision. Specifically, the controller 170 may increase the distance from the object as a braking condition of the AEB 210 and the FCW 211.

When the vehicle travels on a general road, the controller 170 may control the ADAS 200 to suit the general road. (S550).

For example, when the vehicle travels on the general road, the controller 170 may turn the function of the ADAS 200 related to lane keeping off. Specifically, the controller 170 may turn the LDW 212 and the LKA 213 off. Therefore, when the vehicle travels on a general road, the vehicle may frequently turn to the left or the right to change the lanes, thereby preventing an unnecessary alarm or solving inconvenience generated due to lane keeping control.

For example, when the vehicle travels on the general road, the controller 170 may turn the function of the ADAS 200 related to traveling on upon encountering a traffic jam. Specifically, the controller 170 may turn the TJA 222 on. Therefore, it is possible to provide convenience to the driver even upon encountering a traffic jam due to traffic signals.

Meanwhile, although operation of steps S510 to S530 is performed by the controller 170 in the present embodiment, the present invention is not limited thereto and the operation may be performed by the processor of the camera 122.

Meanwhile, steps S510 to S530 may be included in step S330 of FIG. 3. In addition, steps S540 to S550 may be included in step S340 of FIG. 3.

FIG. 6 is a diagram referenced to describe operation of selecting a driver type according to an embodiment of the present invention.

Referring to FIG. 6, the display unit 141 may display a screen for selecting a driver type. In this case, the driver type may be divided according to the driving skill or physical features of the driver.

When the driving skill is selected according to user input, the display unit 141 may display a screen for selecting any one of a beginner 611, an intermediate 612 and a skilled person 613. According to user input, any one of the beginner 611, the intermediate 612 and the skilled person 613 may be selected.

When the physical feature is selected according to user input, the display unit 141 may display a screen for selecting any one of an elderly person 621, a disabled person 622 and a pregnant woman 623. According to user input, any one of the elderly person 621, the disabled person 622 and the pregnant woman 623 may be selected.

FIGS. 7 to 9 are diagrams referenced to describe operation of sensing a driver's condition according to an embodiment of the present invention.

First, operation of acquiring the image of the interior of the vehicle and detecting a driver 710 and a fellow passenger 720 according to an embodiment of the present invention will be described with reference to FIG. 7.

The internal camera 122*c* may capture an image of the interior of the vehicle.

The processor of the internal camera 122*c* may detect the driver 710 from the image of the interior of the vehicle, analyze the operation or facial image of the detected driver 710, and check the driver's condition 710. Thereafter, the controller 170 may receive driver state information from the internal camera 122*c*.

Alternatively, the controller 170 may receive the image of the interior of the vehicle from the internal camera 122*c*, detect the driver 710, analyze the operation or facial image of the detected driver 710, and check the driver's condition.

Meanwhile, the processor of the internal camera 122*c* may detect whether the fellow passenger 720 gets into the vehicle and in which seat the fellow passenger sits from the image of the interior of the vehicle. The controller 170 may receive information indicating whether the fellow passenger 720 gets into the vehicle and in which seat the fellow passenger sits.

Meanwhile, controller 170 may receive the image of the inside of the internal camera 122*c* and detect whether the fellow passenger 720 gets into the vehicle and in which seat the fellow passenger sits.

Next, operation of detecting the driver's condition 710 through image processing according to an embodiment of the present invention will be described with reference to FIG. 8.

The processor of the internal camera 122*c* or the controller 170 may detect the head 810 of the driver and track the detected head 810.

If nodding of the head 810 is detected as a result of tracking, the processor of the internal camera 122*c* or the controller 170 may determine that the driver's condition is drowsiness.

If the head 810 of the driver is inclined by a predetermined range or more as a result of tracking or is turned to the left or the right, the processor of the internal camera 122*c* or the controller 170 may determine that the driver's condition is inattentiveness.

The processor of the internal camera 122*c* or the controller 170 may detect the eyes 820 of the driver and track the detected eyes 820.

If it is detected that the eyes 820 blink by a predetermined number per unit time as a result of tracking, the processor of the internal camera 122*c* or the controller 170 may determine that the driver's condition is drowsiness.

If closing of the eyes 820 is detected for a predetermined time or more, the processor of the internal camera 122*c* or the controller 170 may determine that the driver's condition is drowsiness.

If the eyes 820 are deviated from a front side of the vehicle during a predetermined time or more as a result of tracking, the processor of the internal camera 122*c* or the controller 170 may determine that the driver's condition is inattentiveness.

The processor of the internal camera 122*c* or the controller 170 may track the mouth 830 of the driver and track the detected mouth 830.

If the number of yawns is equal to or greater than a predetermined number per unit time as a result of tracking, the processor of the internal camera 122*c* or the controller 170 may determine that the driver's condition is drowsiness.

Next, operation of detecting the driver's condition based on a driving pattern according to an embodiment of the present invention will be described with reference to FIG. 9.

The controller 170 may determine the driver's condition based on the driving pattern or habit of the driver.

The controller 170 may perform driver authentication through the biometric information of the driver when the driver gets into the vehicle.

The sensing unit 125 of the vehicle 100 may further include a biometric information sensor (not shown) for sensing biometric information.

The biometric information sensor (not shown) senses and acquires the biometric information of the driver. The biometric information may be fingerprint information, iris-scan information, retina-scan information, hand geometry information, facial recognition information, and voice recognition information. The biometric information sensor (not shown) may include a sensor for sensing the biometric information of a passenger. Here, the camera 122 and the microphone 123 may operate as a sensor. The biometric information sensor (not shown) may acquire hand geometry information and facial recognition information through the internal camera 122*c*. The biometric information sensor (not shown) may acquire voice recognition information through the microphone 123.

Meanwhile, the biometric information sensor (not shown) may further include a fingerprint scanner, an iris scanner or a retina scanner in order to acquire the fingerprint information, the iris-scan information or the retina-scan information.

The controller 170 may store the driving habit or pattern of the driver after performing driver authentication.

The controller 170 may store the control habit or pattern of the driving operation unit 121 of the driver. For example, the controller 170 may store a degree of pressing down the brake pedal upon deceleration, a habit of repeatedly pressing and releasing the brake pedal upon deceleration, and an RPM or a degree of pressing down an accelerator pedal upon acceleration in the memory 130.

Thereafter, when the driver gets into the vehicle in a state of storing the driving habit or pattern in the memory 130, the controller 170 authenticates the driver through the biometric information sensor (not shown). Thereafter, the controller 170 may compare the driving habit or pattern of the driver with the driving habit or pattern stored in the memory 130, thereby sensing the driver's condition.

For example, if the degree of pressing down the brake pedal or the accelerator pedal 910 is different from pre-stored data, the controller 170 may determine that the driver's condition is drowsiness.

The controller 170 may determine the driver's condition based on steering of the driver. If the vehicle departs from the driving lane by a predetermined number or more through steering operation of the driver in a state of recognizing the driving lane through the front camera 122*a* or the around view camera 122*b*, the controller 170 may determine that the driver's condition is drowsiness or inattentiveness.

That is, if uncomfortable steering or rapid steering is detected, the controller 170 may determine that the driver's condition is drowsiness or inattentiveness. Meanwhile, uncomfortable steering may be detected through a steering sensor.

The controller 170 may determine the driver's condition based on the driving driver's condition.

For example, when the vehicle travels on an expressway without a traffic jam at a predetermined speed or less for a predetermined time or more, the controller 170 may determine that the driver's condition is drowsiness or inattentiveness.

For example, if a predetermined number of times of rapid acceleration or quick braking is sensed in a state of setting a lane, the controller 170 may determine that the driver's condition is drowsiness or inattentiveness.

For example, if a predetermined number of times of lane departure is sensed in a state of setting a lane, the controller 170 may determine that the driver's condition is drowsiness or inattentiveness.

FIG. 10 is a diagram referenced to describe ADAS control operation according to surrounding environment according to an embodiment of the present invention.

Referring to FIG. 10, the controller 170 may control the ADAS function according to the condition around the vehicle. Here, the condition around the vehicle may include the flow of an object around the vehicle, a driving road, illuminance or weather.

The controller 170 may sense objects 1010 and 1011 around the vehicle through the sensing unit 125. At this time, as the sensing unit, the front camera 122*a*, the around view camera 122*b*, a radar, a Lidar, an ultrasonic sensor, etc. may be used.

Here, the object may be an obstacle which may cause an accident, such as a peripheral vehicle, a pedestrian, a two-wheeled vehicle, a structure, etc.

In a state of detecting the objects 1010 and 1011, the controller 170 may analyze the flow of the objects 1010 and 1011. Specifically, the controller 170 may analyze whether the object is approaching the vehicle 100 or how fast the object approaches the vehicle.

The controller 170 may determine whether the object is a dangerous element based on at least one of the positions of the objects 1010 and 1011, change in movement of the objects 1010 and 1011, and the distance from and the relative speed of the objects 1010 and 1011.

Upon determining that the object is a dangerous element, the controller 170 may control the ADAS 200 in consideration of the objects 1010 and 1011 in addition to the driver type and the driver's condition.

For example, if the object is determined as a dangerous element because the driver type is a skilled person, the driver's condition is a normal state and thus the functions of the AEB 210, the FCW 211, the SAS 214, and the BSD 217 are turned off, the controller 170 may switch at least one of the functions of the AEB 210, the FCW 211, the SAS 214 and the BSD 217 to the ON state.

The controller 170 may sense the driving road 1020 through the sensing unit 125. At this time, as the sensing unit, the front camera 122*a* or the around view camera 122*b* may be used. Meanwhile, the RSR 215 of the ADAS 200 may be used to sense the driving road 1020.

For example, the controller 170 determine whether the vehicle 100 travels on an expressway or a general road based on at least one of a tollgate, a pedestrian, a two-wheeled vehicle, trees, a signpost, a speed limit sign, a traffic sign and road display information.

When the vehicle travels on the expressway, the controller 170 may turn the functions of the ADAS 200 related to lane keeping, cruise control and following a preceding vehicle on. Specifically, the controller 170 may turn on the LDW 212, the LKA 213, the SAS 214, the CSWS 219 and the ACC 220.

When the vehicle travels on the expressway, the function of the ADAS 200 related to lane keeping is turned on, thereby keeping the lane.

When the vehicle travels on the expressway, the function of the ADAS 200 related to cruise control is turned on, thereby preventing speeding.

When the vehicle travels on the expressway, the function of the ADAS 200 related to following a preceding vehicle is turned on, thereby providing convenience to the driver.

For example, when the vehicle travels on the expressway, the controller 170 may adjust the step of the function of the ADAS 200 related to provision. Specifically, the controller 170 may increase the distance from the object as a braking condition of the AEB 210 and the FCW 211.

For example, when the vehicle travels on a general road, the controller 170 may turn the function of the ADAS 200 related to lane keeping off. Specifically, the controller 170 may turn the LDW 212 and the LKA 213 off. Therefore, when the vehicle travels on a general road, the vehicle may frequently turn to the left or the right to change the lanes, thereby preventing an unnecessary alarm or solving inconvenience generated due to lane keeping control.

When the vehicle travels on a general road, the controller 170 may turn the function of the ADAS 200 related to traveling on upon encountering a traffic jam. Specifically, the controller 170 may turn the TJA 222 on. Therefore, it is possible to provide convenience to the driver even upon encountering a traffic jam due to traffic signals.

The controller 170 may sense illuminance or weather through the sensing unit 125. The controller 170 may control the function of the ADAS 200 based on the sensed illuminance or weather.

If illuminance is low at night or if it rains or snows, a probability of accident is high and thus the controller 170 may perform control to turn functions of the AEB 210, the FCW 211, the LDW 212, the LKA 213, the SAS 214, the HBA 216, the BSD 217, the AES 218 and the CSWS 219 on.

If illuminance is low at night or if it rains or snows, since the view of the driver is restricted, the controller 170 may increase the distance from the object as a braking condition of the AEB 210.

FIG. 11 is a diagram referenced to describe ADAS function control operation based on driver type according to an embodiment of the present invention.

Referring to FIG. 11, in the case of default settings, the controller 170 may perform control to turn the functions of the AEB 210, the FCW 211, the TSR 215 and the AES 218 on. In addition, the controller 170 may perform control to maintain the LDW 212, the LKA 213 and the BSD 217 at an engine off state after finishing previous driving. In addition, the controller 170 may perform control to turn the functions of the SAS 214 and the HBA 216 off.

If the driver type is a beginner, an elderly person or a disabled person, the controller 170 may set the AEB 210 and the FCW 211 to a first level and perform control to turn the LDW 212, the LKA 213, the SAS 214, the TSR 215, the HBA 216, the BSD 217 and the AES 218 on.

Meanwhile, stepwise control of the AEB 210 and the FCW 211 may be performed based on the distance from a detected front object when the vehicle completely stops through braking of the AEB 210 and the FCW 211.

If the driver type is an intermediate, the controller 170 may set the AEB 210 and the FCW 211 to a second level and may perform control to turn the LDW 212, the LKA 213, the TSR 215 and the BSD 217 on. In addition, the controller 170 may perform control to turn the SAS 214 and the HBA 216 off.

If the driver type is a skilled person, the controller 170 may set the AEB 210 and the FCW 211 to a third level and perform control to turn the TSR 215 on. In addition, the controller 170 may perform control to turn the LDW 212, the LKA 213, the SAS 214, the HBA 216, the BSD 217 and the AES 218 off.

If the driver type is a pregnant woman, the controller 170 may perform control to turn the LDW 212, the LKA 213, the TSR 215, the HBA 216, the BSD 217 and the AES 218 on. In addition, the controller 170 may perform control to turn off the AEB 210, the FCW 211 and the SAS 214 capable of performing quick braking.

Meanwhile, in some embodiments, the controller 170 may perform ON or OFF setting or stepwise setting of each function of the ADAS 200 according to received user input.

Meanwhile, the ADAS function control described with reference to FIG. 11 is only exemplary and the ADAS function may be variously controlled according to conditions.

FIG. 12 is a diagram referenced to describe operation performed when a driver type is a pregnant woman according to an embodiment of the present invention.

Referring to FIG. 12, the controller 170 may select a pregnant woman 1210 as the driver type according to user input.

In this case, the controller 170 pairs with a wearable device 1220 of the pregnant woman 1210 through the short-range communication module 113. In this case, the controller 170 may receive the biometric information of the pregnant woman sensed by the wearable device 1220.

Thereafter, the controller 170 may perform control to turn on the function of the ADAS 200 suitable for the pregnant woman.

When an abnormal biometric signal is received from the wearable device 1220 while the vehicle travels 1230, the controller 17 may transmit the biometric information of the pregnant woman to the external server 320 through the V2X communication module 116. Here, the external server 320 may be located at a hospital.

Upon determining that the pregnant woman needs to come to the hospital, the controller 170 may receive information for recommending that the pregnant woman should come to the hospital from the external server 320. In this case, the external server 320 may automatically book the hospital for the pregnant woman 1210.

When the information for recommending that the pregnant woman should come to the hospital is received, the controller 170 may receive user input for determining whether the pregnant woman comes to the hospital.

Upon determining that the pregnant woman comes to the hospital, the controller 170 may perform control such that the vehicle travels toward the hospital 1240 as a new destination. When the vehicle 100 is an autonomous vehicle, the controller 170 may enter an autonomous driving mode. At this time, the controller 170 may maintain the function of the ADAS 200 suitable for the pregnant woman.

Upon determining that the pregnant woman does not come to the hospital, the controller 170 may perform control such that the vehicle travels toward a previously set destination.

When no user input is received, the controller 170 may perform control such that the vehicle travels toward a close parking area or service area as a new destination. If an abnormal biometric signal is continuously received from the wearable device 1220, the controller 170 may perform control such that the vehicle travels toward the hospital 1240 as a new destination.

FIGS. 13a to 13c are diagrams referenced to describe operation of outputting an ADAS function operation state according to an embodiment of the present invention.

Referring to FIG. 13a, the controller 170 may output the functions of the ADAS 200 in the ON state to the driver. For example, the controller 170 may display icons 1310, 1311, 1312 and 1313 corresponding to the ADAS functions on the display unit 141 to display the ADAS functions in the ON state. For example, the controller 170 may display texts 1320, 1321, 1322 and 1323 on the display unit 142 to display the ADAS function in the ON state.

Referring to FIG. 13b, when the driver type is selected, the controller 170 may output the ADAS functions controlled in stages or selectively to the driver according to selection.

For example, the controller 170 may display the driver type 1330 when the pregnant woman 1330 is selected as the driver type. In addition, the controller 170 may display information on ADAS functions 1331, 1332, 1333 and 1334 controlled in stages or selectively to the driver according to selection of the driver type.

Meanwhile, in some embodiments, the controller 170 may display the driver's condition or a surrounding environment in addition to the driver type. In addition, the controller 170 may display the ON or OFF state of the ADAS functions according to the driver's condition or surrounding environment.

Referring to FIG. 13c, the controller 170 may differently output an output method according to ADAS function. The controller 170 may output the control states of the plurality of ADAS functions through the display unit 141, the sound output unit 142, the haptic output unit 143 or the lamp drive unit 154.

The controller 170 may output the ADAS control states by changing the strength, pattern or period of vibration, through the haptic output unit 143.

The controller 170 may continuously output the ADAS control states through the lamp drive unit 154 until a dangerous state is released. Meanwhile, the state information may be visually delivered to another vehicle through the lamp drive unit 154.

The controller 170 may output audibly the information through the sound output unit 142.

The present invention may be implemented as code that can be written to a computer-readable recording medium and can thus be read by a computer. The computer-readable recording medium may be any type of recording device in which data can be stored in a computer-readable manner. Examples of the computer-readable recording medium include a hard disk drive (HDD), a solid state drive (SSD), a silicon disk drive (SDD), a ROM, a RAM, a CD-ROM, a magnetic tape, a floppy disk, optical data storage, and a carrier wave (e.g., data transmission over the Internet). In addition, the computer may include the controller 170 of the terminal. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A vehicle comprising:
    an input unit configured to receive user input for selecting a driver type from among a plurality of preset driver types provided by the vehicle;
    an internal camera configured to:
        sense a driver's condition detected from an image of an interior of the vehicle; and
        sense a passenger detected from the image of the interior of the vehicle; and
    a controller configured to:
        selectively control a plurality of vehicle driving assistance functions according to the selected driver type and the sensed driver's condition;
        selectively control the plurality of vehicle driving assistance functions based on whether the sensed passenger gets into the vehicle and in which seat the passenger is seated; and
        perform braking earlier than braking performed in a general condition in response to detecting an object when the passenger is seated on a seat located behind a front passenger seat.

2. The vehicle according to claim 1, wherein the plurality of preset driver types comprise a plurality of preset driver types categorized according to a plurality of driving skills or a plurality of preset driver types categorized according to a plurality of physical features associated with a person.

3. The vehicle according to claim 1, wherein the controller is further configured to selectively control the plurality of vehicle driving assistance functions according to default settings when the user input is not received.

4. The vehicle according to claim 1, wherein the controller is further configured to:
    analyze a driving pattern based on a degree of pressing down a brake pedal and an accelerator pedal or a steering operation; and
    sense the driver's condition based on the analyzed driving pattern.

5. The vehicle according to claim 1, wherein the plurality of vehicle driving assistance functions comprise at least one of:
    an autonomous emergency braking (AEB) function,
    a forward collision warning (FCW) function,
    a lane departure warning (LDW) function,
    a lane keeping assist (LKA) function,
    a speed assist system (SAS) function,
    a traffic sign recognition (TSR) function,
    an adaptive high beam assist (HBA) function,
    a blind spot detection (BSD) function,
    an autonomous emergency steering (AES) function,
    a curve speed warning system (CSWS) function,
    an adaptive cruise control (ACC) function,
    a smart parking assist system (SPAS) function,
    a traffic jam assist (TJA) function, or
    an around view monitor (AVM) function.

6. The vehicle according to claim 5, wherein the TSR function is always on while the vehicle travels.

7. The vehicle according to claim 1, further comprising a camera configured to sense a condition around the vehicle,
    wherein the controller is further configured to selectively control the plurality of vehicle driving assistance functions according to the sensed condition around the vehicle.

8. The vehicle according to claim 7, wherein the controller is further configured to:
analyze flow of an object detected around the vehicle;
determine whether the object is a dangerous element based on at least one of the analyzed flow, a position of the object, a change in movement of the object, or a distance from the vehicle and a relative speed of the object; and
selectively control the plurality of vehicle driving assistance functions by further considering the object when the object is determined as the dangerous element,
wherein the dangerous element is an object with a probability of accident that is higher than a predetermined value.

9. The vehicle according to claim 7,
wherein the camera detects a driving road, and
wherein the controller is further configured to selectively control the plurality of vehicle driving assistance functions based on whether the detected driving road is an expressway or a general road.

10. The vehicle according to claim 7,
wherein the camera senses illuminance or weather, and
wherein the controller is further configured to selectively control the plurality of vehicle driving assistance functions according to the sensed illuminance or weather.

11. The vehicle according to claim 1, wherein the controller is further configured to selectively control the plurality of vehicle driving assistance functions by preferentially considering the sensed driver's condition to the selected driver type.

12. The vehicle according to claim 1, further comprising an output unit, wherein the controller is further configured to cause the output unit to output an operation state of the selectively controlled plurality of vehicle driving assistance functions.

13. The vehicle according to claim 12, further comprising a communication unit, wherein the controller is further configured to cause the communication unit to transmit information on the operation state of the selectively controlled plurality of vehicle driving assistance functions or information on the sensed driver's condition to another device.

14. The vehicle according to claim 1, wherein all of the plurality of vehicle driving assistance functions are turned on when the selected driver type is a first preset type selected from the plurality of preset driver types.

15. The vehicle according to claim 14, wherein at least one of an autonomous emergency braking (AEB) function, a forward collision warning (FCW) function, or a speed assist system (SAS) function among the plurality of vehicle driving assistance functions is turned off when the selected driver type is a second preset type selected from the plurality of preset driver types.

16. The vehicle according to claim 1, further comprising a communication unit, wherein the controller is further configured to:
receive biometric information of the driver associated with the selected driver type from a wearable device of the driver; and
selectively control the plurality of vehicle driving assistance functions based on the received biometric information.

17. A vehicle driving assistance method comprising:
selecting a driver type from among a plurality of preset driver types provided by a vehicle in response to user input received via an input unit;
sensing a driver's condition via a camera from an image of an interior of the vehicle;
sensing a passenger detected from the image of the interior of the vehicle;
selectively controlling a plurality of vehicle driving assistance functions according to the selected driver type and the sensed driver's condition;
selectively controlling the plurality of vehicle driving assistance functions based on whether the sensed passenger gets into the vehicle and in which seat the passenger is seated; and
performing braking earlier than braking performed in a general condition in response to detecting an object when the passenger is seated on a seat located behind a front passenger seat.

18. The vehicle driving assistance method according to claim 17, wherein the plurality of preset driver types comprise a plurality of preset driver types categorized according to a plurality of driving skills or a plurality of preset driver types categorized according to a plurality of physical features associated with a person.

* * * * *